United States Patent Office 2,780,548
Patented Feb. 5, 1957

2,780,548

GELLED CONDENSED WHEY AND PROCESS

Olof E. Stamberg, Danville, Ill., assignor to Consolidated Products Company, Danville, Ill., a corporation of Nebraska No Drawing. Application May 25, 1953,
Serial No. 357,339

9 Claims. (Cl. 99—4)

The present invention relates to a solid gelled condensed whey and to a process for making this product.

Whey can be condensed to a solids content of from 60 to 80% to obtain a solid material having a consistency suitable for a self-feeding poultry feed. However, poultry will not consume this condensed whey at a uniform rate over a period of time, and this failure is directly attributable to the high solids content of the condensed whey. For this reason, the art has sought methods by which a solid condensed whey product can be prepared at a lower solids concentration than that normally required. This has heretofore required modification of the whey by blending it with other materials.

For example, in U. S. Patent No. 2,465,905 to Meade et al., there is disclosed a condensed whey product which is prepared by heat-treating at 160° F. or higher a mixture of fermented whey and partially delactosed whey, which mixture is said to have a firm consistency at a solids content as low as 40 to 60%. The firm consistency at such a low solids concentration is attributed to the water-retaining polysaccharide gums in the fermented whey, to the lower lactose content and to the denaturation of the whey proteins by the heat-treatment which is said to increase the water-absorbing properties of the proteins.

In U. S. Patent No. 2,555,514 to Sharp et al., there is disclosed a process for producing a concentrated whey concentrate or powder useful as a milk substitute in which whey is subjected to a number of steps including being neutralized with an alkali to a pH of from 6.0 to 6.6, concentrated, the calcium content adjusted, subjected to a high heat-treatment within the range of 200 to 280° F., preferably 250° F., in order to produce a maximum quantity of insoluble edible proteinaceous material as evidenced by a marked flocculation or a pudding-like consistency and thereafter, if desired, spray-dried to produce a powdered material. Additional precipitated protein can be added to the whey before drying.

While the above patents disclose methods for making a concentrated whey product having a comparatively low solids content, the methods and products of the two patents possess a great disadvantage. In the methods of both patents, there is involved at some stage in the processing a treatment at relatively high temperatures which is designed either to denature the proteins or to precipitate insoluble proteinaceous matter. The alteration of the proteins of the whey by denaturation or coagulation may convert them into a form which is less palatable to or digestible by poultry and other animals. Furthermore, in many instances, it is undesirable, from the standpoints of injury to other nutrient materials, cost and convenience, to subject the whey product to a high temperature.

In accordance with the present invention, there is provided a process for making a solid gelled condensed whey of low solids content which does not involve a high temperature treatment in order to effect gelation by denaturation or coagulation of the proteins in the whey. The solid condensed gelled whey of this invention is characterized by proper consistency for feeding to poultry or other animals and by a solids content from about 30% to about 60% to provide a high degree of palatability which results in its consumption by the poultry at a fairly uniform rate over long periods of time. The product can be prepared with a calcium-to-phosphorus ratio that is optimum for nutritive purposes.

In the process of the instant invention, a concentrated whey substantially free from heat-denatured protein is brought to a firm solid consistency, in which state the whey can be characterized as a gel, in the presence of calcium lactate. It has been found that calcium lactate will effect a gelation without the need for heat denaturation or coagulation of the protein and that this gelation can be brought about at solid contents as low as 30%. This action appears to be uniquely attributable to calcium lactate, and the effect is not produced by other inorganic and organic acid salts of calcium or by other metal salts of lactic acid, although such may also be present in the whey. Further, the gelation occurs only when the calcium lactate concentration is within the range from 8 to 32% by weight of the whey solids.

Calcium lactate can be added to the whey or calcium lactate can be formed in situ by addition of calcium or of lactic acid, or a source of calcium can be added to a fermented whey containing lactic acid, and this addition or formation of calcium lactate can be effected at any stage of the preparation of the whey for the gelation, for instance, prior to or after concentration of the whey to the desired solids content.

The gelation is apparently due to physical and/or chemical action of the calcium lactate on the whey. The nature of the action is not as yet understood except that a gel structure is eventually created, but the gelation is effected solely by the calcium lactate; no modification or preparation of the whey is necessary, other than concentration to a solids content of about 30% or more. It is necessary to hold the concentrated whey containing calcium lactate at a temperature below about 90° F. for a time sufficient for the calcium lactate to effect solidification of the whey to a firm consistency. The action of the calcium lactate may or may not proceed at temperatures about 90° F., but at such higher temperatures the whey will not gel. The time required for the product to set up or gel will vary from a few hours to several days, depending upon the calcium lactate concentration, the percentage solids, the volume of the mass and the temperature. Once formed, the gel is reversible, i. e., the gelled whey product may soften if heated to a temperature above about 90° F. but will set up again upon cooling.

An embodiment of the present process comprises the steps, without reference to order, of concentrating whey to a solids content of from about 30% to 60% at a temperature not above about 140° F. and insufficient to denature the whey protein, incorporating with the whey from about 32% to about 8% calcium lactate based on the weight of solids and thereafter holding the condensed whey under conditions favoring the formation of a solid condensed whey having the solids content indicated and having a consistency suitable for feeding to poultry or other animals and having excellent palatability.

Cottage cheese, cream cheese, cheddar cheese, Swiss cheese and casein wheys can be processed in accordance with the invention.

The concentration of the whey can be performed by any of the methods known to the art, provided, however, that the temperature during the concentration is not above about 140° F. and is insufficient to denature the proteins.

The denaturation temperature is a function of time, concentration and pH, and may actually be less than 140° F. Those skilled in the art know and can determine the denaturation temperature for a given set of conditions.

The preferred method for concentrating the whey comprises evaporating the water from the whey under vacuum at slightly raised temperatures in accordance with techniques well known in the art.

The concentrated whey product of the invention which is to be gelled can have a pH of from about 6.80 to about 3.20, representing an acidity of from about 0.08% to about 12.0% calculated as lactic acid, after addition or formation in situ of calcium lactate, and higher excess acidity helps to preserve the product from deterioration by bacteria, yeast and molds. This acidity can be due to lactic acid in excess of that consumed as calcium lactate, or it can be due to added organic or inorganic acids. An excess of acidity in the final product appears not to play a role in the solidification of the product. Products having a final acidity as high as 12%, calculated as lactic acid, have been prepared and have been found entirely satisfactory.

It is desirable in many cases to add sufficient calcium compound to produce a calcium-to-phosphorus ratio of approximately 2:1, which is a ratio recommended for optimum nutrition.

A gelled product made in accordance with this invention will not undergo syneresis upon storage and will retain its original plasticity if packaged in moistureproof containers. Low temperatures will increase the plasticity or viscosity of the products slightly but upon subsequent storage at room temperature the product will again revert to its original consistency.

In order to illustrate the invention and its attendant advantages, the following examples are given. Percentages are by weight.

EXAMPLE 1

Three hundred pounds (300 lbs.) of a condensed cheese whey having a solids content of 52% and an acidity of 9.64% calculated as lactic acid (pH 3.36) was placed in a mixing vessel at a temperature of 79° F. An aqueous solution of lime containing 6.5 lbs. of lime and 14 lbs. of water was added to the condensed whey and the ingredients were mixed for five minutes. The mixture, which at this point was very fluid and had a temperature of 95° F. and a pH of 4.00, was then poured into individual 50-lb. containers. After standing overnight at atmospheric temperatures, the product had a solid cheese-like consistency and analyzed 50.5% total solids and 4.87% acidity calculated as lactic acid.

On feeding the product of this example to poultry, it was observed over a period of several days that the poultry ate very readily and continued to consume a uniform amount of the product.

EXAMPLE 2

Approximately 6,200 gallons of cheese whey was allowed to ripen by natural fermentation to an acidity of 1.18% calculated as lactic acid and was then condensed under vacuum at a temperature of about 140° F. to a solids content of 53% and 10.5% acid as lactic. There was obtained approximately 6,000 lbs. of condensed whey which was placed in a mixing vessel. There was then added a solution of 146 lbs. of lime in 360 lbs. of water.

Mixing was continued for several minutes until the mixture became homogeneous during which time the temperature of the mix rose from 125° F. to about 132° F. The mixture was cooled to 85° F. by passage through a heat exchanger and was packaged in individual 50-lb. containers. It had a pH of 4.00. The product set to a solid cheese-like consistency in less than 24 hours. The calcium-to-phosphorus ratio of the product was about 2:1.

The following table presents analyses of the original condensed whey and the final whey product with respect to total solids, percent ash, percent calcium and percent phosphorus:

Table I

AVERAGE ANALYSES OF SEVERAL SAMPLES

| | Total Solids, percent | Ash, percent | Calcium, percent | Phosphorus, percent |
|---|---|---|---|---|
| Condensed Whey | 50 | 6.81 | 0.75 | 0.97 |
| Gelled Condensed Whey | 50 | 7.98 | 2.14 | 0.92 |

Other products were made following the procedure of this example but varying the final solids concentration from 30 to 60% and varying the amount of lime added from 8.0% to 2.0% based on the whey solids, the less concentrated products requiring higher amounts of lime than the more concentrated products. In each case the final product had the desired solid consistency and was readily eaten by poultry.

Again following the procedure of this example whey in which more than 50% of the lactose had been hydrolyzed by lactase enzyme to glucose and galactose was substituted for the original whey. A solid product was obtained at 50% solids.

EXAMPLE 3

A quantity of cheese whey was condensed under vacuum at a temperature of about 138° F. to 56% solids. Varying amounts of lactic acid were added to individual samples of the condensed whey and in each case 2% by weight of lime based on the weight of sample was thereafter added. After thoroughly mixing the lime and the condensed whey, each sample was allowed to stand at room temperature and in every case a firm solid product resulted.

The following table gives the percent acid calculated as lactic acid of the condensed whey after the addition of lactic acid and the percent acid calculated as lactic acid of the final product:

Table II

| Sample No. | Percent Acid (calculated as lactic), Condensed Whey | Percent Acid (calculated as lactic), Gelled Whey |
|---|---|---|
| 1 | 3.60 | 0.52 |
| 2 | 5.60 | 2.62 |
| 3 | 6.82 | 3.80 |
| 4 | 8.68 | 5.40 |
| 5 | 9.91 | 6.58 |
| 6 | 11.75 | 7.90 |
| 7 | 15.10 | 11.57 |

The data in Table II shows that the acidity of the final product does not influence the consistency of the product within at least the limits of this example.

EXAMPLE 4

Into a mixing vessel there was placed a mixture of 162 lbs. of a naturally fermented, condensed cheese whey having a solids content of 51.5%, 50 lbs. of condensed buttermilk, 15 lbs. of dried buttermilk, 43 lbs. of condensed delactosed whey, 9 lbs. of soya flour, 3.3 lbs. of Vitamin A and D oil, and 0.25% of xanthophyll oil. These ingredients were thoroughly mixed at room temperature and the acidity of the mixture was determined as 8.02% calculated as lactic acid (pH 3.50). There was then added an aqueous solution containing 7.5 lbs. of lime and 20 lbs. of water and mixing was then continued until the mass became homogeneous. The pH then was 4.10. The mass was then poured into individual 50-lb. containers and allowed to stand overnight at room temperature to form a gelled product. The final acidity of the producct was 3.89% calculated as lactic acid (pH 4.10). The solids content of the product was 42.6%.

The product was a cheese-like solid and, when fed to poultry, it was readily eaten for several weeks at a uniform rate.

EXAMPLE 5

Sweet cheese whey was condensed to 50% solids under vacuum at a temperature of about 138° F. The condensed whey had an acidity of 0.90% calculated as lactic acid (pH 5.40). To individual samples of the condensed whey there was added varying amounts of different acid and after the addition of acid 2% by weight of lime based on the weight of condensed whey was mixed with each sample of acidified whey. Each sample was then allowed to set overnight and the resultant products were observed. The following table presents the data obtained in this experiment:

Table III

| Sample No. | Acid Added | Percent Acidity (calc. as lactic acid after addition of acid) | Percent Acidity (calc. as lactic acid after addition of lime) |
| --- | --- | --- | --- |
| 1 | lactic | 9.44 | 5.28 |
| 2 | acetic | 10.70 | 6.62 |
| 3 | phosphoric | 10.70 | 7.50 |
| 4 | sulfuric | 9.35 | 5.10 |
| 5 | hydrochloric | 6.10 | 2.15 |

Only the product of Sample No. 1 was a solid. Sample No. 2 in which acetic acid was employed had a slight body while the other samples evidenced only a slight thickening or increase in viscosity. The data shows clearly that the gelation of the product of this invention is primarily attributable to the calcium lactate.

EXAMPLE 6

A quantity of sweet cheese whey was concentrated to 50% solids by heating under vacuum at a temperature of 140° F. To several samples of the condensed whey there was added calcium lactate in amounts ranging from 8 to 12% based on the weight of the condensed whey. After stirring for several minutes at 76° F. the calcium lactate in each sample was dissolved and the samples were allowed to stand overnight. They had a pH of about 6.20. On the following day each sample had set to a solid cheese-like consistency.

This example supplies further evidence that the gelation of the product is caused by the calcium lactate.

EXAMPLE 7

There was prepared a 60% aqueous solution of a mixture of sucrose and lactose. Individual samples of the sugar solution were acidified with lactic acid, acetic acid, phosphoric acid, sulfuric acid, hydrochloric acid, propionic acid, tartaric acid, citric acid and oxalic acid, respectively. The acid concentration of each sample was approximately 9.0%. There was then added to each sample 3% by weight of lime, based on the weight of sample, which was dissolved by stirring. After allowing the samples to stand overnight, it was observed that only the sugar solution containing lactic acid acquired a firm solid consistency. In the case of the other acids, no gelation or solidification occurred.

This example offers still further evidence that the gelation can be attributed to the calcium lactate in the product.

EXAMPLE 8

A quantity of sweet cheese whey was allowed to ripen by natural fermentation to an acidity of 1.08% calculated as lactic acid. The resulting acid whey was neutralized with lime to an acidity of 0.62% (pH 5.6). The whey was then condensed to approximately 50% solids by heating in vacuum at a temperature of about 136° F. Approximately half of the mixture was packaged into 50-lb. containers directly from the evaporator while at a temperature of 126° F. The other half of the mixture was passed through a heat exchanger and cooled to 85° F. before packaging. The portion of the mixture which was precooled gelled to a cheese-like consistency in less than 24 hours in room temperature while the portion which was not precooled required about 3 days for gelation.

The final product had a solids content of 51% and an acid content of 5.61% calculated as lactic acid (pH 3.8). When fed to poultry, the product was readily consumed.

In the examples, calcium carbonate or calcium hydroxide can be substituted for lime. Casein whey can also be used instead of cheese whey.

It is intended to cover all changes and modifications in the examples of this invention, herein given for purposes of disclosure, which do not constitute departure from the spirit and scope of the appended claims.

I claim:

1. A process for gelling a condensed whey containing the natural whey proteins in undenatured form and having a solids content within the range from about 30% to about 60% which comprises holding the whey at a temperature below about 90° F. in the presence of from about 32% to about 8% calcium lactate by weight of the whey solids for a time within the range from a few hours to several days to permit action of the calcium lactate on the whey and effect gelation of the whey.

2. A process for the preparation of a gelled, condensed whey having a relatively low solids content and containing the natural whey proteins in undenatured form which comprises condensing whey to a solids content of from about 30 to about 60% at a temperature about 140° F. and below the denaturation temperature of the whey proteins, incorporating in the whey from about 32% to about 8% of calcium lactate by weight of the whey solids and holding the condensed whey at a temperature below about 90° F. in the presence of calcium lactate for a time within the range from a few hours to several days to permit action of the calcium lactate on the whey and effect gelation of the whey.

3. A process for producing a gelled, condensed whey having relatively low solids content and containing the whey proteins in undenatured form which comprises the preliminary steps, without reference to order, of condensing whey at a temperature below the denaturation temperature of the whey proteins to a solids content of from about 30 to about 60% and incorporating therein from about 32% to about 8% of the calcium lactate by weight of whey solids, and the final step of holding the condensed whey under conditions favoring gelation at a temperature below about 90° F. for a time within the range from several hours to a few days until a gelled product is obtained.

4. A process according to claim 1 in which a calcium compound other than calcium lactate is added to a condensed fermented whey having an acidity of from about 15% to about 3% calculated as lactic acid in an amount of from about 8% to about 2% based on the whey solids to react with the lactic acid and produce calcium lactate in the stated amount.

5. A process according to claim 4 in which the calcium compound is calcium hydroxide.

6. A process according to claim 4 in which the calcium compound is calcium carbonate.

7. A gelled condensed whey having a solids content of from about 30% to about 60% and containing the natural whey proteins in undenatured form and having from about 32% to about 8% of calcium lactate by weight of whey solids.

8. A gelled condensed whey in accordance with claim 7 comprising lactase-hydrolyzed whey.

9. A gelled condensed whey in accordance with claim 7 comprising delactosed whey, buttermilk, soya flour and vitamin oil.

References Cited in the file of this patent

UNITED STATES PATENTS

| | | |
|---|---|---|
| 2,163,331 | Spellacy | June 20, 1939 |
| 2,232,248 | Lavett | Feb. 18, 1941 |
| 2,336,634 | Peebles | Dec. 14, 1943 |
| 2,465,905 | Meade et al. | Mar. 29, 1949 |
| 2,555,514 | Sharp | June 5, 1951 |